(12) United States Patent
Koo (10) Patent No.: US 9,440,628 B2
(45) Date of Patent: Sep. 13, 2016

(54) BRAKE DEVICE FOR VEHICLE

(71) Applicant: HYUNDAI MOBIS CO., LTD., Seoul (KR)

(72) Inventor: Chang Hoe Koo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 189 days.

(21) Appl. No.: 14/088,259

(22) Filed: Nov. 22, 2013

(65) Prior Publication Data

US 2015/0115701 A1 Apr. 30, 2015

(30) Foreign Application Priority Data

Oct. 25, 2013 (KR) .................. 10-2013-0128115

(51) Int. Cl.

| B60T 13/74 | (2006.01) |
|---|---|
| B60T 11/224 | (2006.01) |
| B60T 11/232 | (2006.01) |
| B60T 13/66 | (2006.01) |
| B60T 13/68 | (2006.01) |
| B60T 8/66 | (2006.01) |

(52) U.S. Cl.
CPC ........... *B60T 11/224* (2013.01); *B60T 11/232* (2013.01); *B60T 13/662* (2013.01); *B60T 13/686* (2013.01); *B60T 13/745* (2013.01)

(58) Field of Classification Search
CPC .............. B60T 8/00; B60T 8/17; B60T 8/40; B60T 8/4004; B60T 8/42; B60T 8/44; B60T 13/00; B60T 13/142; B60T 13/66; B60T 15/00; B60T 17/08; B60T 13/168; B60T 13/686; B60T 13/745; B60T 13/58; B60T 13/588; B60T 13/146; B60T 13/662; B60T 15/028; B60T 11/224; B60T 11/232
USPC .......... 303/3, 15, 157, 158, 115.1, 115.2, 20
See application file for complete search history.

(56) References Cited

U.S. PATENT DOCUMENTS

| 4,950,028 | A | * | 8/1990 | Harrison .................. 303/113.2 |
|---|---|---|---|---|
| 5,713,640 | A | * | 2/1998 | Feigel et al. ............... 303/115.2 |
| 6,234,758 | B1 | * | 5/2001 | Pawelski ..................... 417/26 |
| 2011/0241419 | A1 | * | 10/2011 | Ohkubo et al. ............. 303/9.62 |
| 2013/0207452 | A1 | * | 8/2013 | Gilles et al. ............... 303/9.75 |
| 2013/0214587 | A1 | * | 8/2013 | Yang ......................... 303/6.01 |

FOREIGN PATENT DOCUMENTS

KR 10-0257002 B1 2/2000

* cited by examiner

*Primary Examiner* — Melody Burch
(74) *Attorney, Agent, or Firm* — Knobbe Martens Olson & Bear LLP (57) ABSTRACT

A brake device for a vehicle includes: a cylinder body in which brake oil is compressed; a first piston pressurizing brake oil while moving along the inside of the cylinder body; a connection part having a smaller outer diameter than the first piston, and including one side connected to the first piston and the other side extended to the outside of the cylinder body; a pipe line part connecting the cylinder body and a wheel brake, and transferring the brake oil compressed through the movement of the connection part to the wheel brake; and a valve controlling the flow of the brake oil transferred along the pipe line part.

7 Claims, 8 Drawing Sheets

BRAKE DEVICE FOR VEHICLE

CROSS-REFERENCES TO RELATED APPLICATIONS

The present application claims priority to Korean application number 10-2013-0128115, filed on Oct. 25, 2013, which is incorporated by reference in its entirety.

BACKGROUND OF THE INVENTION

The present invention relates to a brake device for a vehicle, and more particularly, to a brake device for a vehicle, which is capable of varying an effective cross-sectional area of a master cylinder.

In general, an electronic hydraulic brake device senses a pedal pressure of a driver through a sensor, and then adjusts a brake pressure of each wheel using a hydraulic modulator.

Such an electronic hydraulic brake device includes the sensor and a pedal travel simulator. The sensor serves to sense a stroke distance of a pedal so as to determine a brake pressure desired by a driver, and the pedal travel simulator serves to make the driver feel a pedal pressure similar to that of a general hydraulic brake device.

Thus, when the driver steps on the brake pedal, the sensor measures a moving distance of the brake pedal, and a master cylinder generates a brake oil pressure according to the operation of the brake pedal.

When a piston of the master cylinder is operated to pressurize brake oil within a cylinder body, the pressurized brake oil is transferred to a wheel cylinder so as to generate a brake force.

The pressure generated from the master cylinder is set according to the inner diameter of the cylinder body and the capacity of a motor.

While the vehicle is operated for common use, the master cylinder requires a relatively low pressure and high response. On the other hand, during an emergency brake situation such as an ABS control situation or brake locking situation, the master cylinder requires a relatively high pressure and low response.

When the motor has a constant capacity, it is desirable that the master cylinder has a large inner diameter in the common-use situation and a small inner diameter in the emergency brake situation.

The related art of the present invention is disclosed in Korean Patent Laid-open Publication No. 1998-0016916 published on Jun. 5, 1998, and entitled "Vapor-lock detecting device of brake master cylinder"

The master cylinder used in the conventional brake device has a single effective cross-sectional area to generate a pressure. Thus, when the pressure generated from the master cylinder is varied, the capacity of the motor must be increased. Thus, the manufacturing cost is inevitably increased, and the size of products is also increased. Therefore, there is a demand for a structure capable of improving the problems.

SUMMARY OF THE INVENTION

Embodiments of the present invention are directed to a brake device for a vehicle, which is capable of varying an effective cross-sectional area of a master cylinder to generate a pressure, depending on situations.

In one embodiment, a brake device for a vehicle includes: a cylinder body in which brake oil is compressed; a first piston pressurizing brake oil while moving along the inside of the cylinder body; a connection part having a smaller outer diameter than the first piston, and including one side connected to the first piston and the other side extended to the outside of the cylinder body; a pipe line part connecting the cylinder body and a wheel brake, and transferring the brake oil compressed through the movement of the connection part to the wheel brake; and a valve controlling the flow of the brake oil transferred along the pipe line part.

The cylinder body may include: a first chamber positioned between the first piston and a cover member to cover the entrance of the cylinder body, and forming a space in which brake oil is compressed through the movement of the first piston; and a second chamber forming a space to be filled with brake oil, between the first piston and a boundary barrier of the cylinder body through which the connection part passes.

The pipe line part may include: a first pipe line connecting the first chamber and the wheel brake so as to guide the transfer of the brake oil; and a second pipe line connecting the second chamber and the wheel brake so as to guide the transfer of the brake oil.

The valve may be installed in the second pipe line, and may open/close a flow path of the second pipe line according to a control signal of a control unit.

The connection part may include: a connection body extended from the first piston to the outside of the cylinder body; and a gear protrusion extended from the connection body to the outside of the cylinder body and having a male screw formed on the outside thereof.

The brake device may further include: a connection gear part including an inner hole into which the gear protrusion is inserted, and having a female screw formed along the inner surface thereof so as to be engaged with the male screw; and a motor rotating the connection gear part so as to move the connection part and the first piston.

The connection part may include: a first connection member extended from the first piston to the outside of the cylinder body, and having a hollow portion formed therein; and a second connection member extended from the first connection member to the outside of the cylinder body, and having a female screw formed on the inner surface thereof.

The brake device may further include: a screw bar inserted into the second connection member, and having a male screw provided on the outside thereof so as to be engaged with the female screw; and a motor rotating the screw bar to move the connection part and the first piston.

The brake device may further include: a fixed bar having one side connected to a cover member to cover the first piston and the entrance of the cylinder body and the other side extended to a hollow portion of the first connection member through the first piston; and a second piston part installed in the fixed bar so as to move along the hollow portion of the first connection member.

The connection part may have a smaller outer diameter than the first piston, and the second piston part may have a smaller outer diameter than the connection part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
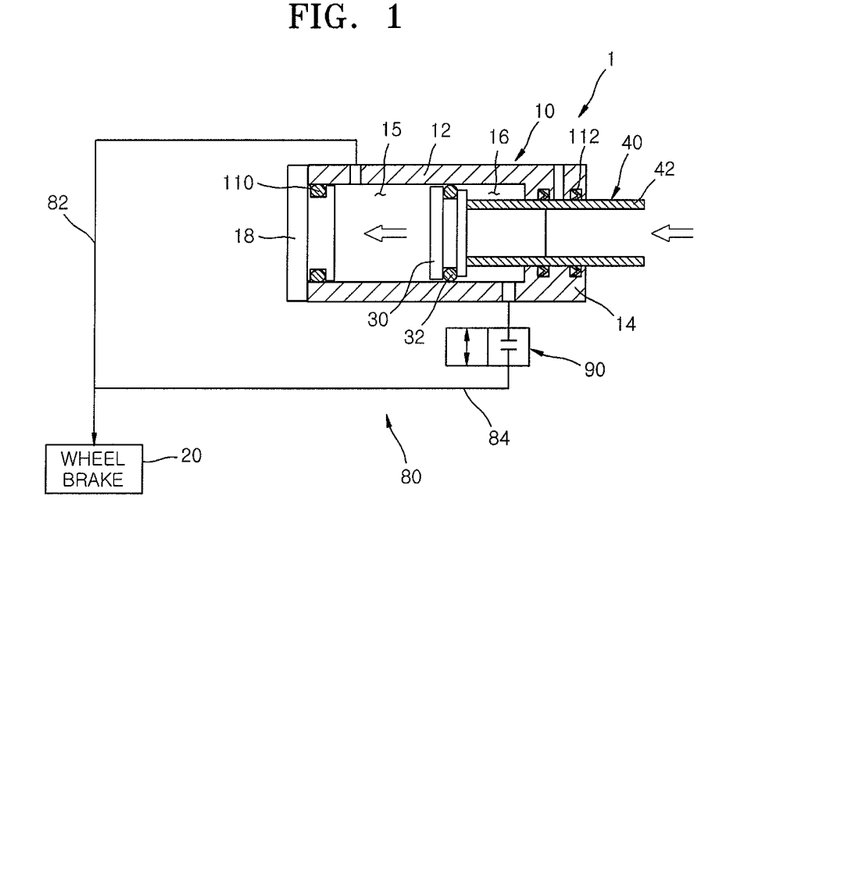
FIG. 1 is a diagram schematically illustrating the structure of a brake device for a vehicle in accordance with an embodiment of the present invention.
Figure 2:
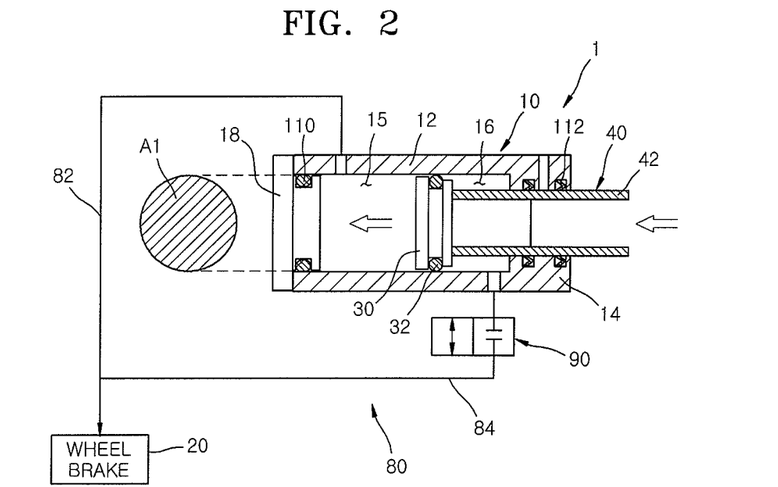
FIG. 2 is a diagram schematically illustrating a state in which the brake device for a vehicle in accordance with the embodiment of the present invention is operated in a low-pressure section.
Figure 3:
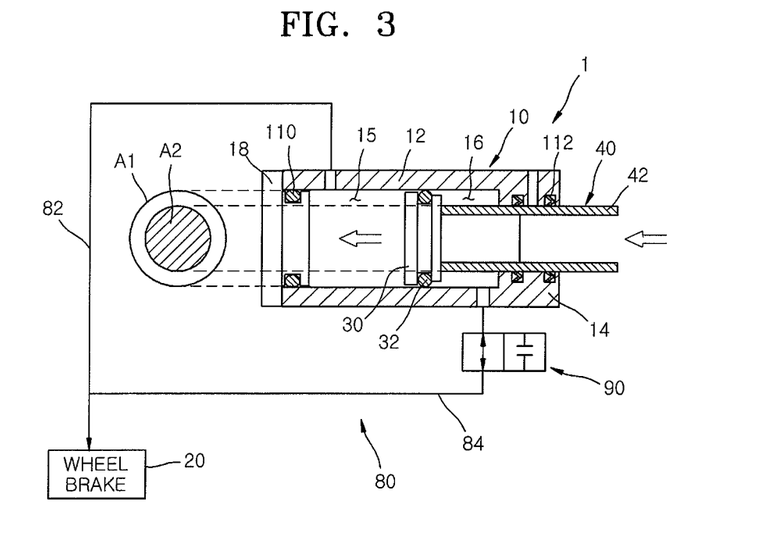
FIG. 3 is a diagram schematically illustrating a state in which the brake device for a vehicle in accordance with the embodiment of the present invention is operated in a high-pressure section.
Figure 4:
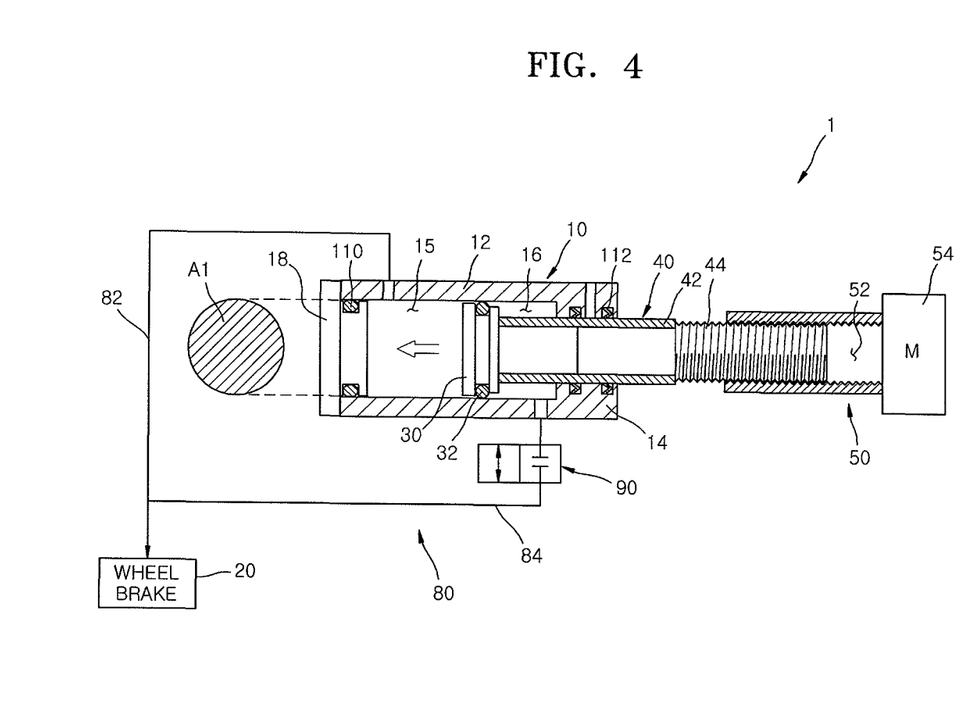
FIG. 4 is a diagram schematically illustrating a state in which the brake device for a vehicle in accordance with the embodiment of the present invention includes a gear protrusion and is operated in the low-pressure section.
Figure 5:
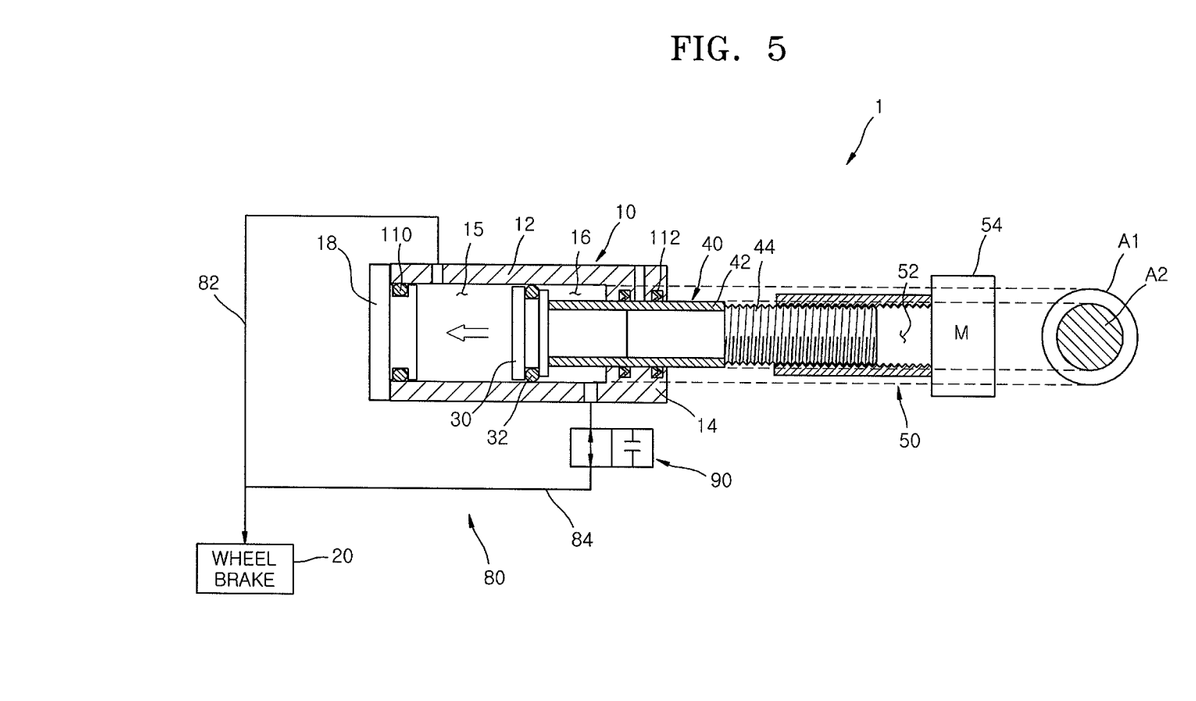
FIG. 5 is a diagram schematically illustrating a state in which the brake device for a vehicle in accordance with the embodiment of the present invention includes the gear protrusion and is operated in the high-pressure section.

FIG. 1 is a diagram schematically illustrating the structure of a brake device for a vehicle in accordance with an embodiment of the present invention. FIG. 2 is a diagram schematically illustrating a state in which the brake device for a vehicle in accordance with the embodiment of the present invention is operated in a low-pressure section. FIG. 3 is a diagram schematically illustrating a state in which the brake device for a vehicle in accordance with the embodiment of the present invention is operated in a high-pressure section. FIG. 4 is a diagram schematically illustrating a state in which the brake device for a vehicle in accordance with the embodiment of the present invention includes a gear protrusion and is operated in the low-pressure section. FIG. 5 is a diagram schematically illustrating a state in which the brake device for a vehicle in accordance with the embodiment of the present invention includes a gear protrusion and is operated in the high-pressure section.

Referring to FIGS. 1 to 3, the brake device 1 for a vehicle in accordance with the embodiment of the present invention includes a cylinder body 10, a first piston 30, a connection part 40, a pipe line part 80, and a valve 90. The cylinder body 10 has a space in which brake oil is compressed. The first piston 30 serves to pressurize the brake oil while moving along the inside of the cylinder body 10. The connection part 40 has a smaller diameter than the first piston 30, and includes one side connected to the first piston 30 and the other side connected to the outside of the cylinder body 10. The pipe line part 80 connects the cylinder body 10 and the wheel brake 20 and transfers the brake oil compressed by the movement of the connection part 40 to the wheel brake 20. The valve 90 controls the flow of the brake oil transferred along the pipe line part 80.

The cylinder body 10 forming the exterior of the master cylinder may be modified into various structures, as long as they have a space in which the first piston 30 is moved.

The cylinder body 10 in accordance with the embodiment of the present invention includes a cylinder main body 12, a boundary barrier 14, and first and second chambers 15 and 16.

The cylinder main body 12 has an internal space in which the first piston 30 is linearly moved. The cylinder main body 12 includes a cover member 18 installed at one side thereof (the left side of FIG. 1) and the boundary barrier 14 installed at the other side thereof (the right side of FIG. 1).

Based on the first piston 30 positioned inside the cylinder main body 12, the first and second chambers 15 and 16 are distinguished from each other.

The first chamber 15 is positioned between the first piston 30 and the cover member 18 to cover the entrance of the cylinder body 10, and forms a space in which brake oil is compressed by the movement of the first piston 30.

The brake oil within the first chamber 15 is compressed through the operation of the first piston 30 and then transferred to the wheel brake 20.

The second chamber 16 forms a space to be filled with brake oil, between the first piston 30 and the boundary barrier 14 of the cylinder body 10 through which the connection part 40 passes.

The boundary barrier 14 facing the second chamber 16 is integrally formed with the cylinder body 10, and includes a moving path of the connection part 40 extended from the first piston 30.

The first piston 30 and the connection part 40 may be integrally formed with each other, or may be separately manufactured and then coupled to each other, if necessary.

A cover sealing 110 is installed on the outer circumference of the cover member 18 to cover one side of the cylinder main body 12. Thus, leakage of the brake oil is blocked by the cover sealing 110.

Furthermore, a body sealing 112 is installed on the inner surface of the boundary barrier 14 facing the connection body 42 of the connection part 40. Thus, leakage of the brake oil between the connection part 40 and the boundary barrier 14 is blocked by the body sealing 112.

The brake oil compressed in the cylinder body 10 is transferred to the wheel brake 20 along the pipe line part 80.

The detailed structure of the wheel brake 20 operated by the brake oil is well known to those skilled in the art. Thus, the detailed descriptions thereof are omitted herein.

The first piston 30 may be modified into various structures, as long as they can pressurize brake oil while moving along the inside of the cylinder body 10.

The first piston 30 in accordance with the embodiment of the present invention has a circular cross-sectional shape, and a first seal member 32 is installed along the outer circumference of the first piston 30.

The first seal member 32 blocks the brake oil from moving between the first piston 30 and the cylinder main body 12.

Referring to FIGS. 4 and 5, the connection part 40 has a smaller diameter than the first piston 30, one side of the connection part 40 (the left side of FIG. 4) is extended to the first piston 30, and the other side of the connection part (the right side of FIG. 4) is connected to the outside of the cylinder body 10.

The connection part 40 may include various structures, as long as they can transmit power of a driving device to the first piston 30 so as to linearly move the first piston 30.

The connection part 40 in accordance with the embodiment of the present invention includes a connection body 42 and a gear protrusion 44. The connection body 42 is extended from the first piston 30 to the outside of the cylinder body 10, and the gear protrusion 44 is extended from the connection body 42 to the outside of the cylinder body 10 and has a male screw formed on the outside thereof.

One side of the connection body 42 is connected to the first piston 30, and the other side of the connection body 42 is extended to the outside of the cylinder body 10 through the boundary barrier 14 of the cylinder body 10.

The boundary barrier 14 facing the connection body 42 has a protrusion formed therein, and the connection body 42 has a groove into which the protrusion is inserted to slidably move. Thus, the rotation of the connection body 42 is restricted, and the connection body 42 is allowed to be linearly moved along the cylinder main body 12.

The other side of the connection body 42 is connected to the gear protrusion 44, and the gear protrusion 44 has a male screw provided on the outside thereof so as to be engaged with a connection gear part 50.

The connection gear part 50 includes an inner hole 52 to which the gear protrusion 44 is inserted, and has a female screw formed on the inner surface thereof so as to be engaged with the male screw of the gear protrusion 44.

The gear protrusion 44 in accordance with the embodiment of the present invention has a rod shape, and the connection gear part 50 to which the gear protrusion 44 is inserted and coupled has a pipe shape.

The connection gear part 50 includes an inner hole 52 having a female screw formed on the inner surface thereof, and the gear protrusion 44 is inserted into the inner hole 52 such that the male screw and the female screw are engaged with each other.

A motor 54 connected to the other side of the connection gear part 50 rotates the connection gear part 50 so as to move the connection part 40 and the first piston 30.

The motor 54 is installed to be fixed inside the vehicle. When the connection gear part 50 is rotated by the operation of the motor 54, the gear protrusion 44 engaged with the inside of the connection gear part 50 is linearly moved along the inside of the cylinder main body 12.

When the brake oil is pressurized by the operation of the motor 54, the pressurized brake oil is transferred to the wheel brake 20 along the pipe line part 80.

The pipe line part 80 connects the cylinder body 10 and the wheel brake 20, and may be modified into various structures as long as they can transfer the brake oil compressed by the movement of the connection part 40 to the wheel brake 20.

The pipe line part 80 in accordance with the embodiment of the present invention includes a first pipe line 82 and a second pipe line 84. The first pipe line 82 connects the first chamber 15 and the wheel brake 20 so as to guide the transfer of brake oil, and the second pipe line 84 connects the second chamber 16 and the wheel brake 20 so as to guide the transfer of brake oil.

The first pipe line 82 and the second pipe line 84 communicate with each other, and the valve 90 which controls the flow of the brake oil transferred along the pipe line 80 is installed in the second pipe line 84.

The valve 90 is operated according to a control signal of a control unit, and opens/closes the flow path of the second pipe line 84. Thus, the valve 90 may adjust a pressure difference between the first and second chambers 15 and 16.

When the valve 90 is operated to open the flow path of the second pipe line 84, the brake oil pressures of the first and second chambers 15 and 16 are equalized to each other.

Then, when the valve 90 closes the flow path of the second pipe line 84, the brake oil pressures of the first and second chambers 15 and 16 are changed.

The valve 90 in accordance with the embodiment of the present invention may include a solenoid valve which opens/closes the second pipe line 84 according to control of the control unit.

Referring to FIGS. 2 and 4, when the brake device 1 for a vehicle is operated in a low-pressure section, the transfer of brake oil through the second pipe line 84 is blocked. Thus, the brake oil pressures of the first and second chambers 15 and 16 differ from each other.

Thus, a first effective cross-sectional area A1 to compress the brake oil within the first chamber 15 through the movement of the first piston 30 is equal to the cross-sectional area of the first piston 30.

Referring to FIGS. 3 and 5, when the brake device 1 for a vehicle is operated in a high-pressure section, the transfer of the brake oil through the second pipe line 84 is allowed. Thus, the brake oil pressures of the first and second chambers 15 and 16 are equalized to each other.

Thus, a second effective cross-sectional area A2 to compress the brake oil within the first chamber 15 through the movement of the first piston 30 has the same diameter as the outer diameter of the connection body 42.

Since the second effective cross-sectional area A2 is smaller than the first effective cross-sectional area A1, the pressures to compress the brake oil in the high-pressure section and the low-pressure section, respectively, differ from each other.

In the present embodiment, each of the first and second chambers 15 and 16 is provided as one chamber, but this is only an example. Each of the first and second chambers 15 and 16 may include a plurality of chambers, and the installation position and number of the first piston 30 may be set in various manners.

Hereafter, the operation of the brake device 1 for a vehicle in accordance with the embodiment of the present invention will be described in detail with reference to the accompanying drawings.

Referring to FIG. 4, when low-pressure brake oil is required, the second pipe line 84 is closed through the operation of the valve 90, and the motor 54 is operated.

As the connection gear part 50 connected to the shaft of the motor 54 is rotated, power is transmitted through the gear protrusion 44 engaged with the screw thread-shaped gear formed on the inner surface of the connection gear part 50.

Since the connection part 40 is only allowed to be linearly moved in a state where the rotation is restricted, the connection part 40 is linearly moved through the rotation of the connection gear part 50.

As the first piston 30 connected to the connection part 40 is moved along the inside of the cylinder main body 12 so as to approach the cover member 18, the first piston 30 pressurizes the brake oil within the first chamber 15.

In the low-pressure section, the first effective cross-sectional area A1 is equal to the cross-sectional area of the first piston 30.

The load of the motor 54 to operate the first piston 30 is equal to a value obtained by multiplying the first effective cross-sectional area A1 by the pressure to pressurize the brake oil through the first effective cross-sectional area A1.

Furthermore, the amount of brake oil discharged from the cylinder body 10 is equal to a value obtained by multiplying the first effective cross-sectional area A1 by a stroke at which the first piston 30 is moved.

Referring to FIG. 5, when high-pressure brake oil is required, the motor 54 is operated in a state where the second pipe line 84 is opened through the operation of the valve 90.

When the second pipe line 84 is opened in a section where high pressure is required, the pressures of the first and second chambers 15 and 16 are equalized to each other. Thus, since a force applied to an area obtained by subtracting the outer diameter of the connection body 42 from the outer diameter of the first piston 30 in the first chamber 15 offsets a force applied to an area obtained by subtracting the outer diameter of the connection body 42 from the outer diameter of the first piston 30 in the second chamber, the diameter of the second effective cross-sectional area A2 is equal to the outer diameter of the connection body 42.

The connection gear part 50 connected to the shaft of the motor 54 is rotated, and the connection part 40 connected to the connection gear part 50 is only allowed to be linearly moved in a state where the rotation is restricted. Thus, the connection part 40 is linearly moved through the rotation of the connection gear part 50.

As the first piston 30 connected to the connection part 40 is moved along the inside of the cylinder main body 12 so as to approach the cover member 18, the first piston 30 pressurizes the brake oil within the first chamber 15.

In the high-pressure section, the load of the motor 54 to operate the first piston 30 is equal to a value obtained by multiplying the second effective cross-sectional area A2 by the pressure to pressurize the brake oil through the second effective cross-sectional area A2.

Furthermore, the amount of brake oil discharged from the cylinder body 10 is equal to a value obtained by multiplying the second effective cross-sectional area A2 by a stroke at which the first piston 30 is moved.

Since the first and second effective cross-sectional areas A1 and A2 to pressurize the brake oil are varied depending on situations, the capacity and weight of the motor 54 may be reduced. Furthermore, when the brake device 1 for a vehicle is operated in the low-pressure section, fast response may be secured, and when the brake device 1 is operated in the high-pressure section, the effective cross-sectional area may be reduced to generate a high pressure, without an additional force.

Hereafter, a brake device for a vehicle in accordance with another embodiment of the present invention will be described with reference to the drawings.

For convenience of description, like reference numerals will represent the same components as those of the above-described embodiment, and the detailed descriptions thereof are omitted herein.

Figure 6:
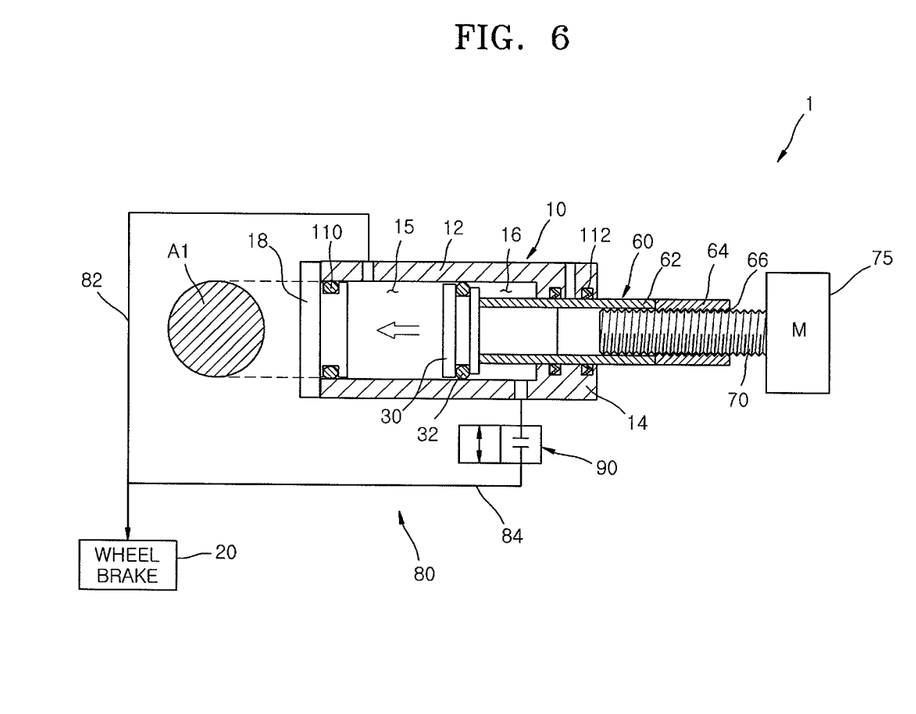
FIG. 6 is a diagram schematically illustrating a state in which a brake device for a vehicle in accordance with another embodiment of the present invention is operated in a low-pressure section.
Figure 7:
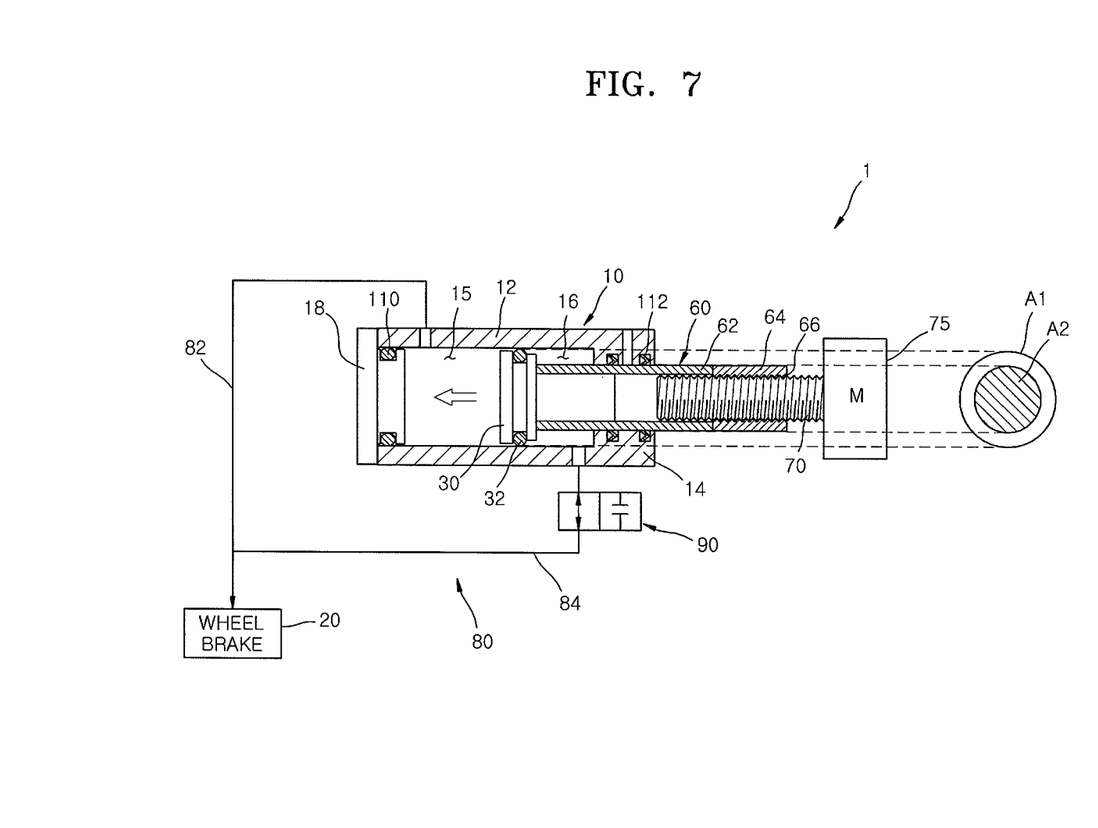
FIG. 7 is a diagram schematically illustrating a state in which the brake device for a vehicle in accordance with the embodiment of the present invention is operated in a high-pressure section.
Figure 8:
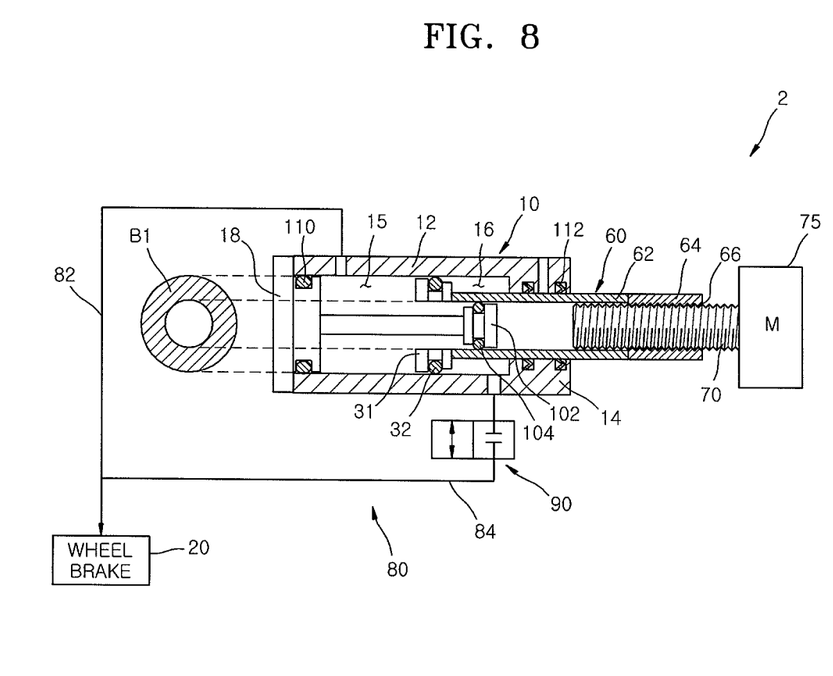
FIG. 8 is a diagram schematically illustrating a state in which the brake device for a vehicle in accordance with the embodiment of the present invention includes a second piston part and is operated in the low-pressure section.
Figure 9:
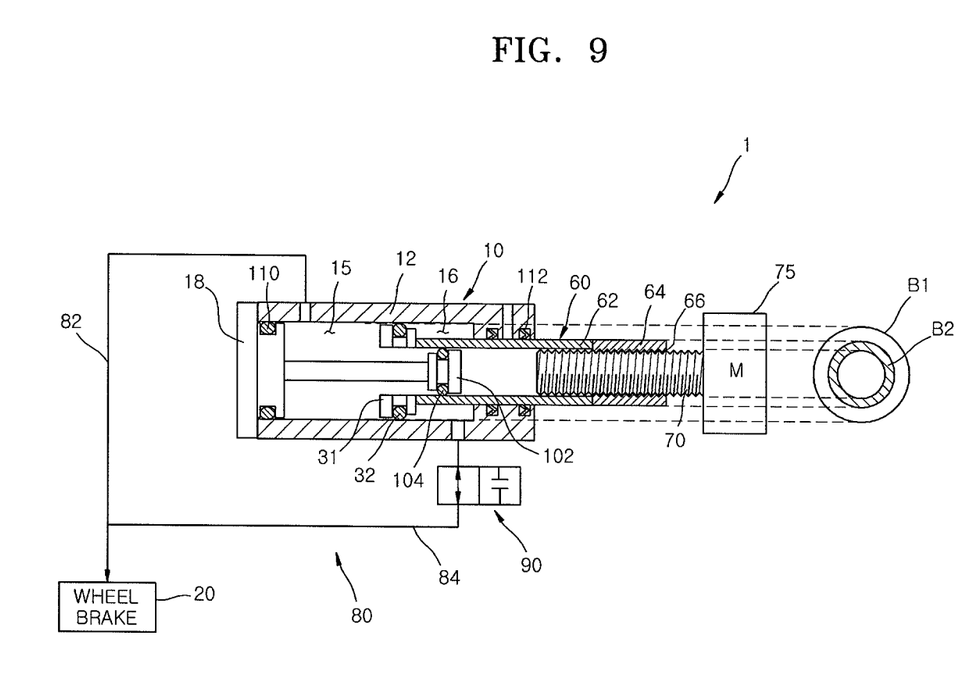
FIG. 9 is a diagram schematically illustrating a state in which the brake device for a vehicle in accordance with the embodiment of the present invention includes the second piston part and is operated in the high-pressure section.

FIG. 6 is a diagram schematically illustrating a state in which a brake device for a vehicle in accordance with another embodiment of the present invention is operated in a low-pressure section. FIG. 7 is a diagram schematically illustrating a state in which the brake device for a vehicle in accordance with the embodiment of the present invention is operated in a high-pressure section. FIG. 8 is a diagram schematically illustrating a state in which the brake device for a vehicle in accordance with the embodiment of the present invention includes a second piston part and is operated in the low-pressure section. FIG. 9 is a diagram schematically illustrating a state in which the brake device for a vehicle in accordance with the embodiment of the present invention includes the second piston part and is operated in the high-pressure section.

Referring to FIGS. 6 and 7, a connection part 60 in accordance with the embodiment of the present invention includes a first connection member 62 and a second connection member 64. The first connection member 62 is extended from the first piston 30 to the outside of the cylinder body 10 and has a hollow portion formed therein, and the second connection member 64 is extended from the first connection member 62 to the outside of the cylinder body 10 and has a gear hole 66 provided therein, the gear hole 66 having a female screw formed on the inner surface thereof.

The gear hole 66 provided in the second connection member 64 has a screw thread formed in a spiral shape.

The first piston 30 and the connection part 60 may be integrally formed with each other, or may be separately formed and then coupled to each other, if necessary.

The first connection member 62 is formed in a pipe shape, and one side of the first connection member 62 is connected to the first piston 30.

The other side of the first connection member 62 is connected to the pipe-shaped second connection member 64, and the second connection member 64 has the gear hole 66 provided therein, the gear hole 66 having a female screw formed on the inner surface thereof.

The connection part 60 passing through the boundary barrier 14 is installed to linearly move along the cylinder main body 12 in a state where the rotation is restricted.

A screw bar 70 inserted into the second connection member 64 may include various structures, as long as they have a male screw provided on the outside thereof so as to be coupled to the female screw of the gear hole 66.

A motor 75 may include various types of driving devices, as long as they can rotate the screw bar 70 to move the connection part 60 and the first piston 30.

Since the motor 75 in accordance with the embodiment of the present invention has an output shaft connected to the screw bar 70, the screw bar 70 is rotated through the operation of the motor 75.

Referring to FIGS. 8 and 9, one side of a fixed bar 100 is connected to the cover member 18, and the other side of the fixed bar 100 is extended to the hollow portion formed in the first connection member 62 through the first piston 31.

The first piston 31 and the connection part 60 may be integrally formed with each other, or may be separately formed and then coupled to each other, if necessary.

The first piston 31 has a hollow portion formed therein, through which the second piston part 102 is moved.

The second piston part 102 is installed at the other side of the fixed bar 100, and the position of the first connection member 62 contacted with the second piston part 102 is varied through the movement of the connection part 60.

The connection part 60 has a smaller outer diameter than the first piston 31, and the second piston part 102 has a smaller outer diameter than the connection part 60.

Since a second seal member 104 is installed outside the second piston part 102, the second seal member 104 blocks brake oil from moving to the outside of the second piston part 102 and the inside of the first connection member 62.

When the brake device 2 for a vehicle in accordance with the embodiment of the present invention is operated in a low-pressure section, an area obtained by subtracting the cross-sectional area of the second piston part 102 from the cross-sectional area of the first piston 31 is a third effective cross-sectional area B1 formed by the movement of the first piston 31.

When the brake device 2 is operated in the low-pressure section, the valve 90 is operated to equalize the pressures of the first and second chambers 15 and 16.

Thus, the pressures of brake oils in both sides of the first piston 31 positioned outside the outer diameter of the first connection member 62 are equal to each other. Thus, the cross-sectional area thereof is excluded from the effective cross-sectional area, and the portion where the second piston part 102 is positioned is excluded from the compression of the brake oil.

Therefore, when the brake device 2 for a vehicle in accordance with the embodiment of the present invention is operated in a high-pressure section, a cross-sectional area between the inner diameter and the outer diameter of the first connection member 62 is a fourth effective cross-sectional area B2 formed through the movement of the first piston 31.

The ratio of the third effective cross-sectional area B1 and the fourth effective cross-sectional area B2 may be adjusted depending on the shape and outer diameter of the second piston part 102. Thus, the outer diameter of the second piston part 102 may be varied while maintaining the layout in which the screw bar 70 is positioned in the second connection member 64, which makes it possible to facilitate the change of design.

Furthermore, since the length of the connection part 60 does not need to be increased, the design may be easily changed without increasing the whole length of a product. Furthermore, since the screw bar 70 is stably installed in the second connection member 64, the durability of the screw bar 70 may be improved.

As described above, the effective cross-sectional area of the master cylinder to generate a pressure is varied depending on the high-pressure section and the low-pressure section, even though the capacity of the motor is not increased. Therefore, it is possible to reduce a manufacturing cost.

Furthermore, since the size and weight of a product including the motor may be reduced, it is possible to improve the design flexibility of the product.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A brake device for a vehicle, comprising:
a cylinder body comprising a bore;
a piston slidably engaged with the bore of the cylinder body and configured to slide within the bore relative to the cylinder body, the piston comprising a first surface and a second surface that faces away from the first surface;
a connection part connecting between the piston and a motor located outside the cylinder body such that the piston slides along a direction as the motor operates based on a motor control signal, wherein at least part of the connection part is located within the cylinder body and comprises a circumference;
a first chamber defined between the bore and the first surface of the piston such that the first chamber's volume changes as the piston slides relative to the cylinder body;
a second chamber defined between the bore, the circumference of the connection part and the second surface of the piston such that the second chamber's volume increases as the first chamber's volume decreases;
a first pipe line connecting between the first chamber and a wheel brake for fluid communication therebetween;
a second pipe line installed between the second chamber and the first pipe line; and
a valve installed in the second pipe line and configured to selectively open or close based on a valve control signal for selectively allowing fluid communication between the second chamber and the first pipe line such that, when the valve opens, brake oil from the first chamber is transmitted to the wheel brake and also in part to the second chamber via the second pipe line whereas, when the valve closes, brake oil from the first chamber is transmitted to the wheel brake without being transmitted to the second chamber.

2. The brake device of claim 1, wherein the connection part comprises:
a connection body extended from the piston to the outside of the cylinder body; and
a gear protrusion extended from the connection body to the outside of the cylinder body and having a male screw formed on the outside thereof.

3. The brake device of claim 2, further comprising:
a connection gear including an inner hole into which the gear protrusion is inserted, and the connection gear having a female screw formed along an inner surface thereof for engaging with the male screw; and
wherein the motor is configured to rotate the connection gear, which causes the connection part and the piston to move.

4. The brake device of claim 1, wherein the connection part comprises:
a first connection member extended from the piston to the outside of the cylinder body, and having a hollow portion formed therein; and
a second connection member extended from the first connection member to the outside of the cylinder body, and having a female screw formed on an inner surface thereof.

5. The brake device of claim 4, further comprising:
a screw bar inserted into the second connection member, the screw bar having a male screw formed on an outer surface thereof and configured to engage with the female screw of the second connection member; and
wherein the motor is configured to rotate the screw bar, which causes the connection part and the first piston to move.

6. The brake device of claim 5,
wherein the piston is referred to as a first piston,
wherein the first piston has an opening connected to the hollow portion of the first connection member, and
wherein the brake device further comprises:
a bar fixed to the cylinder body inside the first chamber, the bar extending in the direction into the hollow portion of the first connection member through the opening of the first piston; and
a second piston formed at one end of the bar, the second piston slidably engaged with the hollow portion of the first connection member.

7. The brake device of claim 6, wherein the connection part has a smaller outer diameter than the first piston, and the second piston has a smaller outer diameter than the connection part.

* * * * *